Sheet 1. 3. Sheets.
WILSON AGER.
Improvement in Machine for Cleaning and Scouring Rice, Coffee, and other Grain.
No. 4,579. Reissued Oct. 10. 1871.
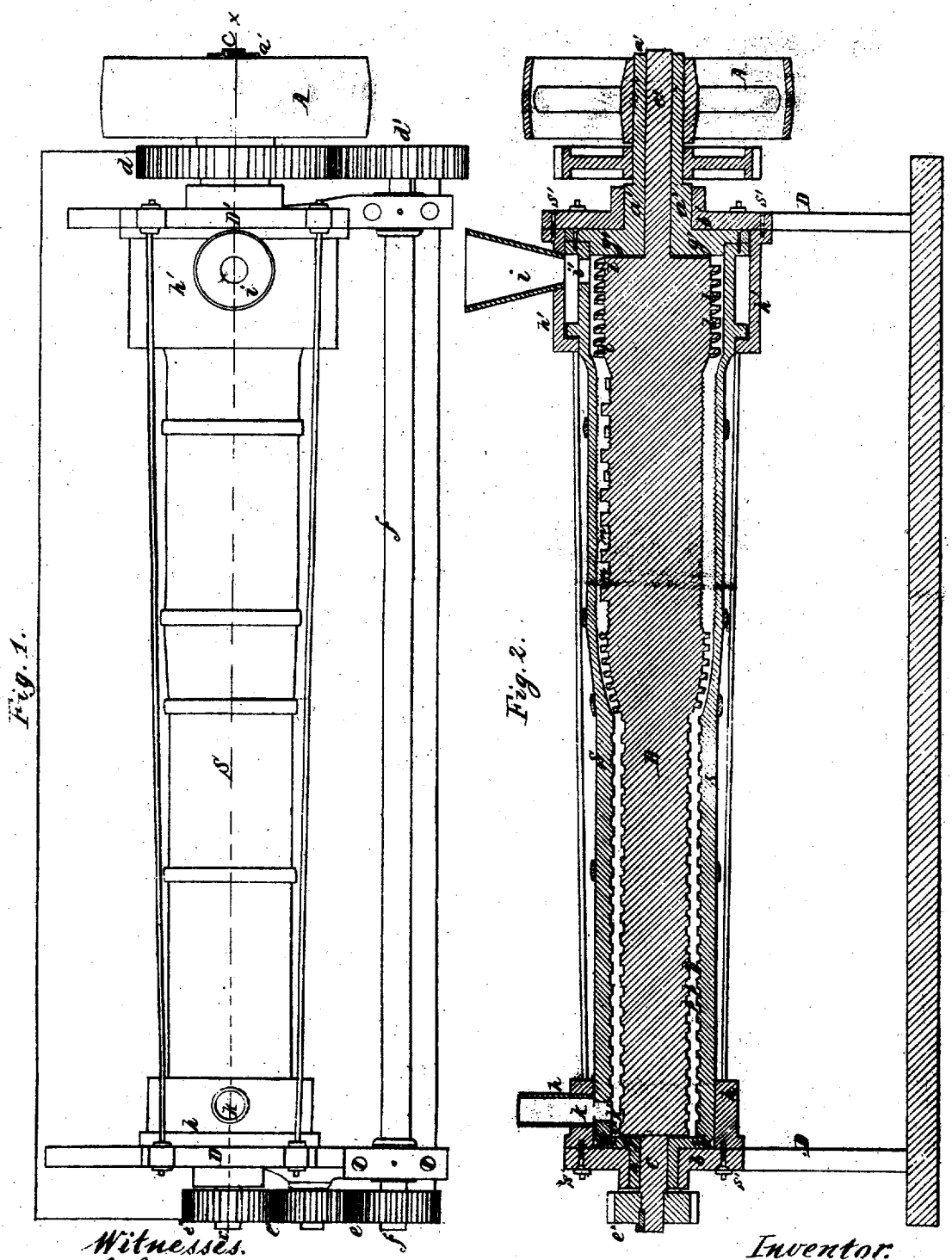
Witnesses.
A. Moore
Otway Hughes
Inventor.
Wilson Ager
By Daniel Breul

WILSON AGER.

Improvement in Machine for Cleaning and Scouring Rice, Coffee, and other Grain.

No. 4,579. Reissued Oct. 10, 1871.

Witnesses.
A. Moore
George Houghton

Inventor.
Wilson Ager
By Daniel Breed
Atty

WILSON AGER.

Improvement in Machine for Cleaning and Scouring Rice, Coffee, and other Grain

No. 4,579.

Reissued Oct. 10, 1871.

Witnesses.
A. Moore
George Hughes

Inventor.
Wilson Ager
By Daniel Breed
Atty

UNITED STATES PATENT OFFICE

WILSON AGER, OF WASHINGTON, DISTRICT OF COLUMBIA.

IMPROVEMENT IN MACHINES FOR CLEANING AND SCOURING RICE, COFFEE, AND OTHER GRAIN.

Specification forming part of Letters Patent No. 18,177, dated September 15, 1857; reissue No. 4,579, dated October 10, 1871; extended seven years.

*To all whom it may concern:*

Be it known that I, WILSON AGER, now of Washington, in the District of Columbia, have invented a new and useful Improvement in Hulling and Cleaning Rice, Coffee, and other Grain; and I do hereby declare that the following is a full, clear, and exact description of the same, reference being had to the annexed drawing forming part of this specification, in which—

Figure 3:
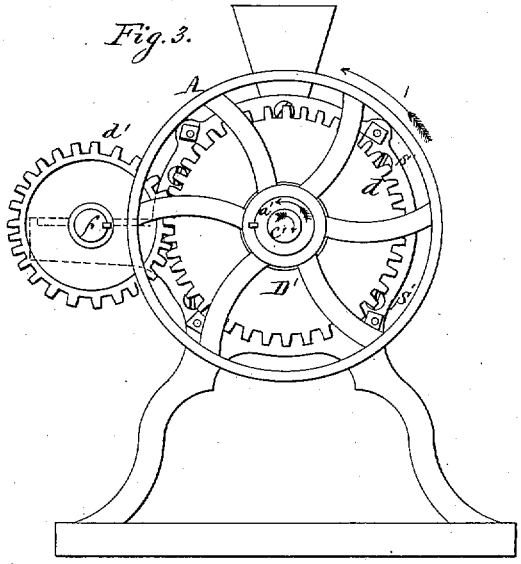
Figure 4:
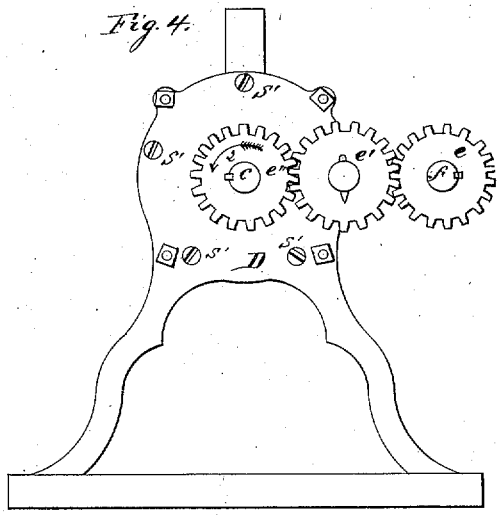
Figure 7:
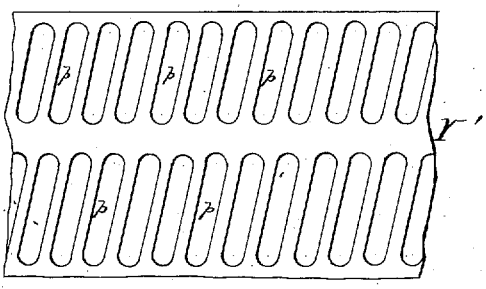
Figure 8:
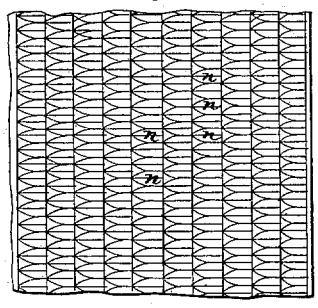
Figure 9:
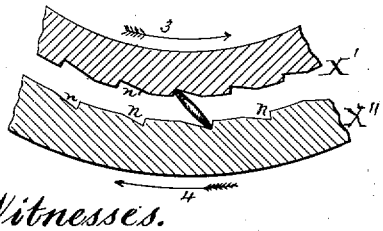
Figure 10:
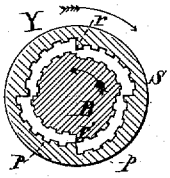
Figure 6:
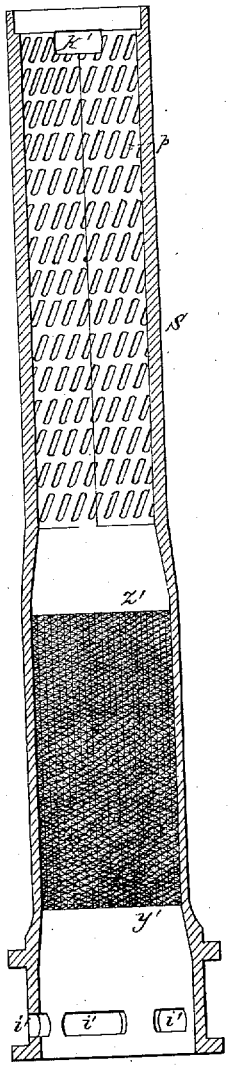
Figure 5:
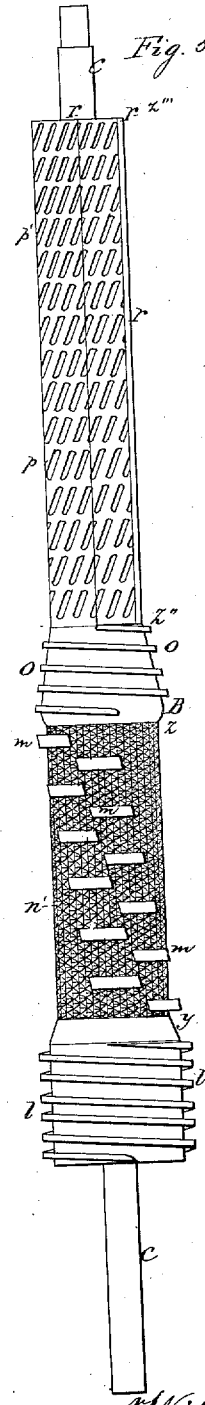

Figure 1 is a top view of the machine by which the operation is effected. Fig. 2 is a vertical section on line *x x*, Fig. 1. Fig. 3 is an elevation of driving-wheel end of machine. Fig. 4 is an elevation of the opposite end showing pinions for rotating the burr. Fig. 5 is a view of the burr removed from the shell. Fig. 6 is a view showing the interior of shell. Figs. 7, 8, and 9 are detached views of the dress. Fig. 10 is a transverse section of the shell and burr in position.

Similar characters of reference in the several figures denote the same parts.

The object of my invention is the cleaning and scouring of the grain ready for use after the removal of the husk therefrom.

Before describing the means I employ to effect that end I will refer briefly to the structure of the grain when rice is to operated upon.

The husk of the paddy is attached to the grain at one extremity only, and can readily be separated therefrom by pressure in direction of the length of the grain. In fact this is the easiest way to effect the separation. After the removal of the husk the grain is found to be covered with a coating, which can readily be removed by rubbing upon some rough substance. The removal of this coating and the separation of the germ constitutes the cleaning of the grain. Regarding the husk, it will be found that its outer surface is roughened somewhat like a file, which property I avail myself of in the cleaning process, as will be hereinafter set forth. The nature of my invention principally consists of the peculiar construction and arrangement of the scouring mechism for the rice or other grain operating upon the mixture of husk and kernels after the grain is hulled, by an alternate packing and loosening action for removing the coating or pellicle and polishing the kernels for the market. The manner in which this packing and rubbing operation is performed consists in the passing of the rice, &c., and husk between the shell and burr, rotating in opposite directions, and so dressed that the husk shall act upon and remove the inner coating aforesaid; and the germ be also separated from the grain during the cleaning operation, the details of construction and operation being as hereinafter set forth.

In the drawing, S is the shell supported by hollow shafts, *a a′*, in bearings *b b′*, and rotated in direction of arrow 1, Fig. 3, by power applied to wheel A secured on hollow shaft *a′*. B is the burr, having spindles *c c′* at its extremities passing through hollow shafts *a a′* and rotated in direction of arrows 2, Fig. 4, by reason of cog-wheel connections *d d′* between shafts *a′* and *f*; and pinion connections *e e′ e″* between shaft *f* and spindle *c*. The hollow-shafts *a a′* are upon heads *g g′*, secured in the ends of the shell or concave S, as shown in Fig. 2. The shell S is encased in bands *h h′* at the extremities, as shown in Figs. 1 and 2. On band *h′* is the feed-hopper *i* communicating with the surface of the burr by openings *i′* in the shell, Figs. 2 and 6. Band *h* has a discharge-pipe *k*, outlets *k′* in the shell permitting the passage of the grain. The bands are secured to the supports D D′ by screw S′, and the shell rotates freely within them. The burr B is formed with a spiral-flange *l*, occupying the position beneath the band *h′* for conveying the paddy or other grain to the hulling portion of the machine. This hulling portion is cylindrical and is represented in Fig. 5 by the part of the burr between *y* and *z*. Its surface has a dress consisting of a system of indentations, *n′* Figs. 8 and 9, having their greatest depth at the base, and reaching the surface at the point. The hulling portion of the shell, shown between *y′* and *z′*, Fig. 6, has a similar dress arranged in inverse order. This dress is shown at X, Fig. 8, and X′, Fig. 9, where X, Fig. 8, represents a portion of the hulling shell of full size; and X′ X″, Fig. 9, a portion of the shell and burr of full size, revolving in opposite directions, as indicated by the arrows 3 and 4, and showing the reverse positions of the indentations. Upon the hulling-cylinder is the double series of deflecting-blocks *m*, arranged spirally, as shown in Fig. 5, the action of which will be hereinafter set forth. From *z* to *z″* of the burr B is a spiral-flange, *o*, which conveys the grain and husk to the cleaning portion of the machine. The burr and concave or shell of this part has the cross-section shown at Y, Fig. 10, and the dress shown at Y′, Fig. 7, the cavities *p p′*, Figs. 5 and 6, being so arranged on the shell and burr as that the two series shall cross when the parts are in position. The cavities shown at Y′ are of full size.

The operation of the hulling and cleaning is as follows: The paddy is fed by the hopper *i* as shell and burr are rotated in oposite directions indicated by arrows 1 and 2. On passing through the openings *i′* of the shell the rice encounters the spiral-flange *l*, and is conveyed by it to the space between the hulling portions of the shell and burr. The paddy on entering this space will encounter some one of the deflecting-blocks *m*, which will turn the grain across the axis of the burr, and in so doing cause one end of the grain to enter a cavity, *n*, in the shell as the other is caught by one of the cavities, *n′*, in the burr, as shown in X′ H″, Fig. 9. The rotation of the shell and burr, as shown by arrows, causes a pressure in the direction of the length of the grain effecting the separation of the husk, as before stated. The grain and husk then pass onward to the spiral-flange *o*, which conveys them to the cleaner. There the rice and husk pack together as the shell and burr rotate in opposite directions, shown by arrows at Y, Fig. 10; the rough surface of the husk rubbing upon the grain and acting as a file to remove the coating therefrom. The eccentricity of the operating surfaces of this portion of the machine cause the greatest packing when the ridges *r r′*, Fig. 10, are opposite each other, and when the ridges pass to the position shown at Y, Fig. 10, the increase of space causes the grain and husk to be changed in relative position, whereby other portions of the grain are submitted to the action of the husk. Therefore, since the shell and burr rotate with considerable rapidity, there is a continual change of position of the substance passing between them, causing the grain to be thoroughly operated upon and the coating entirely removed during the transit of the mixture from *z″* to *z‴*. The cleaned rice and husk are then forced out through passage *k*, Fig. 2, after which the husk may be separated from the grain in any suitable manner. During the rubbing of the rice and husk the ends of the grain will be brought in contact with the edge of some one of the cavities *p p′*, which will cause the germ to separate from the grain.

Having described my invention, I claim—

The method of cleaning and scouring rice, coffee, and other grain by means of the mechanism herein described, consisting chiefly of the shell S provided with the cavities *p* and ridges *r* on its interior surface in combination with burr-cylinder B, provided with similar cavities and ridges *p′ r′* upon its outer surface, as specified and shown, constructed and arranged to operate as described, whereby the grain after being hulled is subjected with the husk to an alternate packing and loosening action while being cleaned and scoured, resulting from the peculiar form and dress of the scouring surfaces above described, substantially as set forth.

WILSON AGER.

Witnesses:
EDM. F. BROWN,
DANIEL BREED.

(70)